(12) United States Patent
Triplett et al.

(10) Patent No.: US 12,089,018 B2
(45) Date of Patent: Sep. 10, 2024

(54) PROVIDING AGGREGATE PLAYBACK INFORMATION

(71) Applicant: Sonos, Inc., Santa Barbara, CA (US)

(72) Inventors: Mark Triplett, St. Charles, IL (US); Jonathan P. Lang, Santa Barbara, CA (US); Jonathon Reilly, Cambridge, MA (US); David Taylor, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 17/460,844

(22) Filed: Aug. 30, 2021

(65) Prior Publication Data

US 2022/0060826 A1 Feb. 24, 2022

Related U.S. Application Data

(63) Continuation of application No. 16/665,649, filed on Oct. 28, 2019, now Pat. No. 11,109,157, which is a
(Continued)

(51) Int. Cl.
*H04R 3/12* (2006.01)
*H04N 21/234* (2011.01)
(Continued)

(52) U.S. Cl.
CPC ......... *H04R 3/12* (2013.01); *H04N 21/23406* (2013.01); *H04N 21/236* (2013.01);
(Continued)

(58) Field of Classification Search
CPC . H04R 3/12; H04R 3/00; H04R 27/00; H04R 29/00; H04R 29/007; H04R 2227/003; H04R 2227/005; H04N 21/236; H04N 21/2365; H04N 21/242; H04N 21/43615; G06F 3/165; G06F 3/167; G06F 16/60; G10L 15/22; H04L 63/08
USPC ......... 381/77, 80, 81, 82, 86, 332, 334, 306, 381/302, 303, 311, 56, 61, 124; 725/10, 725/34, 115; 707/913–916, 758, 769, 707/771, 705, 999.107, 999.003, 17.101,
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

CN 101835027 A 9/2010
CN 102402625 A 4/2012
(Continued)

OTHER PUBLICATIONS

Advisory Action mailed on Jun. 3, 2015, issued in connection with U.S. Appl. No. 13/531,709, filed Jun. 25, 2012, 4 pages.
(Continued)

*Primary Examiner* — Leshui Zhang

(57) ABSTRACT

System, method, and apparatus including receiving an identification of content played by a playback system and an identification of location of the playback system. A playlist of content is associated with the location. A request is received to retrieve the playlist of content and the requested playlist of content is sent to a playback system.

20 Claims, 10 Drawing Sheets

Related U.S. Application Data continuation of application No. 15/728,144, filed on Oct. 9, 2017, now Pat. No. 10,462,569, which is a continuation of application No. 14/862,048, filed on Sep. 22, 2015, now Pat. No. 9,788,115, which is a continuation of application No. 13/531,709, filed on Jun. 25, 2012, now Pat. No. 9,204,174.

(51) Int. Cl.
  *H04N 21/236* (2011.01)
  *H04N 21/2365* (2011.01)
  *H04N 21/242* (2011.01)
  *H04R 27/00* (2006.01)
  *H04R 29/00* (2006.01)

(52) U.S. Cl.
  CPC ....... *H04N 21/2365* (2013.01); *H04N 21/242* (2013.01); *H04R 27/00* (2013.01); *H04R 29/00* (2013.01); *H04R 2227/003* (2013.01); *H04R 2227/005* (2013.01)

(58) Field of Classification Search
  USPC ......... 707/17.102, 17.103, 17.009; 455/2.01, 455/3.01, 3.03, 3.04, 3.05, 3.06; 700/94
  See application file for complete search history.

(56) References Cited

U.S. PATENT DOCUMENTS

| | | |
|---|---|---|
| 6,032,202 A | 2/2000 | Lea et al. |
| 6,469,633 B1 | 10/2002 | Wachter |
| 6,778,869 B2 | 8/2004 | Champion |
| 7,295,548 B2 | 11/2007 | Blank et al. |
| 7,343,384 B2 * | 3/2008 | Plastina .............. G06F 16/639 707/999.005 |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,792,311 B1 | 9/2010 | Holmgren et al. |
| 7,842,876 B2 | 11/2010 | Benyamin |
| 7,853,341 B2 | 12/2010 | McCarty et al. |
| 7,875,788 B2 | 1/2011 | Benyamin |
| 7,987,294 B2 | 7/2011 | Bryce et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,258,390 B1 | 9/2012 | Gossweiler et al. |
| 8,483,853 B1 | 7/2013 | Lambourne |
| 2002/0054134 A1 * | 5/2002 | Kelts .................. G06F 3/0481 715/788 |
| 2002/0124097 A1 | 9/2002 | Isely et al. |
| 2002/0168938 A1 | 11/2002 | Chang |
| 2003/0037157 A1 | 2/2003 | Pestoni et al. |
| 2004/0002938 A1 | 1/2004 | Deguchi |
| 2005/0234995 A1 * | 10/2005 | Plastina .............. G06F 16/637 |
| 2005/0251576 A1 | 11/2005 | Weel et al. |
| 2006/0008256 A1 * | 1/2006 | Khedouri ........... H04N 21/4788 348/E7.071 |
| 2006/0143236 A1 * | 6/2006 | Wu .................... G06F 16/4387 |
| 2006/0236232 A1 | 10/2006 | Yuasa et al. |
| 2006/0265349 A1 * | 11/2006 | Hicken ............... G11B 27/105 |
| 2007/0142944 A1 | 6/2007 | Goldberg et al. |
| 2007/0166687 A1 | 7/2007 | Bell et al. |
| 2007/0250761 A1 | 10/2007 | Bradley et al. |
| 2007/0283008 A1 | 12/2007 | Bucher et al. |
| 2008/0091717 A1 | 4/2008 | Garbow et al. |
| 2008/0147711 A1 * | 6/2008 | Spiegelman ........ G06F 16/4387 707/999.102 |
| 2008/0177893 A1 | 7/2008 | Bowra et al. |
| 2008/0320139 A1 | 12/2008 | Fukuda et al. |
| 2009/0047993 A1 | 2/2009 | Vasa |
| 2009/0062947 A1 | 3/2009 | Lydon et al. |
| 2009/0119273 A1 * | 5/2009 | Nagasaka .............. G06F 16/63 |
| 2009/0164516 A1 * | 6/2009 | Svendsen .............. G06F 16/635 |
| 2009/0313564 A1 | 12/2009 | Rottler et al. |
| 2010/0023578 A1 | 1/2010 | Brant et al. |
| 2010/0185671 A1 | 7/2010 | Burba et al. |
| 2010/0211693 A1 | 8/2010 | Master et al. |
| 2010/0328312 A1 * | 12/2010 | Donaldson ........... G06F 16/639 345/440 |
| 2011/0072355 A1 | 3/2011 | Carter et al. |
| 2011/0224811 A1 | 9/2011 | Lauwers et al. |
| 2012/0096125 A1 | 4/2012 | Kallai et al. |
| 2012/0108293 A1 | 5/2012 | Law et al. |
| 2012/0114336 A1 | 5/2012 | Kim et al. |
| 2012/0117110 A1 | 5/2012 | Amidon et al. |
| 2012/0254256 A1 | 10/2012 | Martin |
| 2012/0254363 A1 | 10/2012 | Martin et al. |
| 2012/0290653 A1 * | 11/2012 | Sharkey .............. G06F 16/4387 709/204 |
| 2013/0104043 A1 | 4/2013 | Whang et al. |
| 2013/0110921 A1 | 5/2013 | Logan et al. |
| 2013/0326354 A1 | 12/2013 | Anderson |
| 2017/0169107 A1 | 6/2017 | Bernhardsson et al. |

FOREIGN PATENT DOCUMENTS

| | | | | |
|---|---|---|---|---|
| EP | 1389853 A1 | 2/2004 | | |
| JP | 2006323556 A | 11/2006 | | |
| JP | 2007081969 A | 3/2007 | | |
| JP | 2009288260 A | * 12/2009 | ............. | G10K 15/00 |
| JP | 2011070641 A | 4/2011 | | |
| WO | 200177905 A2 | 10/2001 | | |
| WO | 2003023786 A2 | 3/2003 | | |
| WO | 2003093950 A2 | 11/2003 | | |
| WO | 2005013047 A2 | 2/2005 | | |
| WO | 2008051882 A2 | 5/2008 | | |
| WO | 2009023289 A1 | 2/2009 | | |

OTHER PUBLICATIONS

Advisory Action mailed on Jun. 7, 2017, issued in connection with U.S. Appl. No. 14/862,048, filed Sep. 22, 2015, 3 pages.
Advisory Action mailed on Jun. 7, 2017, issued in connection with U.S. Appl. No. 14/862,125, filed Sep. 22, 2015, 3 pages.
Advisory Action mailed on Feb. 10, 2021, issued in connection with U.S. Appl. No. 16/665,649, filed Oct. 28, 2019, 3 pages.
Advisory Action mailed on Aug. 19, 2019, issued in connection with U.S. Appl. No. 15/728,144, filed Oct. 9, 2017, 3 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Chinese Patent Office, Chinese Office Action mailed on Dec. 22, 2016, issued in connection with Chinese Application No. 201380044117.3, 18 pages.
Chinese Patent Office, Second Office Action with translation mailed on Jul. 31, 2017, issued in connection with Chinese Application No. 201380044117.3, 19 pages.
Corrected Notice of Allowability mailed on Sep. 30, 2015, issued in connection with U.S. Appl. No. 13/531,709, filed Jun. 25, 2012, 3 pages.
"Denon 2003-2004 Product Catalog," Denon, 2003-2004, 44 pages.
European Patent Office, European Extended Search Report mailed on Dec. 3, 2015, issued in connection with European Application No. 13808779.6, 10 pages.
European Patent Office, Examination Report mailed on Oct. 18, 2016, issued in connection with European Application No. 13808779.6, 5 pages.
Final Office Action mailed on Dec. 1, 2020, issued in connection with U.S. Appl. No. 16/665,649, filed Oct. 28, 2019, 16 pages.
Final Office Action mailed on Apr. 13, 2017, issued in connection with U.S. Appl. No. 14/862,048, filed Sep. 22, 2015, 17 pages.
Final Office Action mailed on Apr. 13, 2017, issued in connection with U.S. Appl. No. 14/862,125, filed Sep. 22, 2015, 20 pages.
Final Office Action mailed on Jun. 14, 2018, issued in connection with U.S. Appl. No. 15/728,144, filed Oct. 9, 2017, 26 pages.

(56) References Cited

OTHER PUBLICATIONS

Final Office Action mailed on Mar. 27, 2015, issued in connection with U.S. Appl. No. 13/531,709, filed Jun. 25, 2012, 12 pages.
Final Office Action mailed on May 30, 2019, issued in connection with U.S. Appl. No. 15/728,144, filed Oct. 9, 2017, 26 pages.
International Searching Authority, International Search Report mailed on Sep. 27, 2013, issued in connection with International Application No. PCT/US2013/046344, filed on Jun. 18, 2013, 5 pages.
International Searching Authority, Written Opinion mailed on Sep. 27, 2013, issued in connection with International Application No. PCT/US2013/046344, filed on Jun. 18, 2013, 6 pages.
Japanese Patent Office, Office Action mailed on Jun. 13, 2017, issued in connection with Japanese patent application No. 2015-520284, 4 pages.
Japanese Patent Office, Office Action Summary mailed on Oct. 11, 2016, issued in connection with Japanese Patent Application No. 2015-520284, 6 pages.
Japanese Patent Office, Office Action Summary mailed on Feb. 9, 2016, issued in connection with Japanese Patent Application No. 2015-520284, 5 pages.
Jo et al., "Synchronized One-to-many Media Streaming with Adaptive Playout Control," Proceedings of SPIE, 2002, pp. 71-82, vol. 4861.
Kumparak, Greg, "Limili Identifies That Song That's Playing, Adds Its To Your Grooveshark Collection", TechCrunch, Nov. 12, 2010, 6 pages, XP055221098.
Non-Final Office Action mailed on Oct. 2, 2014, issued in connection with U.S. Appl. No. 13/531,709, filed Jun. 25, 2012, 15 pages.
Non-Final Office Action mailed on Nov. 4, 2016, issued in connection with U.S. Appl. No. 14/862,048, filed Sep. 22, 2015, 13 pages.
Non-Final Office Action mailed on Nov. 4, 2016, issued in connection with U.S. Appl. No. 14/862,125, filed Sep. 22, 2015, 13 pages.
Non-Final Office Action mailed on Aug. 18, 2020, issued in connection with U.S. Appl. No. 16/665,649, filed Oct. 28, 2019, 17 pages.
Non-Final Office Action mailed on Oct. 5, 2018, issued in connection with U.S. Appl. No. 15/728,144, filed Oct. 9, 2017, 14 pages.
Notice of Allowance mailed on Sep. 11, 2019, issued in connection with U.S. Appl. No. 15/728,144, filed Oct. 9, 2017, 9 pages.
Notice of Allowance mailed on May 12, 2021, issued in connection with U.S. Appl. No. 16/665,649, filed Oct. 28, 2019, 9 pages.
Notice of Allowance mailed on Jun. 23, 2015, issued in connection with U.S. Appl. No. 13/531,709, filed Jun. 25, 2012, 10 pages.
Notice of Allowance mailed on Jul. 27, 2017, issued in connection with U.S. Appl. No. 14/862,048, filed Sep. 22, 2015, 8 pages.
Notice of Allowance mailed on Jul. 27, 2017, issued in connection with U.S. Appl. No. 14/862,125, filed Jul. 22, 2015, 10 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

PROVIDING AGGREGATE PLAYBACK INFORMATION

CROSS REFERENCE TO RELATED APPLICATIONS

This application is a continuation of and claims priority to U.S. patent application Ser. No. 16/665,649 entitled "Providing Aggregate Playback Information" filed on Oct. 28, 2019, which is a continuation of U.S. patent application Ser. No. 15/728,144 entitled "Providing Aggregate Playback Information" filed on Oct. 9, 2017, which is a continuation of U.S. patent application Ser. No. 14/862,048 entitled "Location-Based Playlist" filed on Sep. 22, 2015, which is a continuation of U.S. patent application Ser. No. 13/531,709 entitled "Collecting and Providing Local Playback System Information" filed on Jun. 25, 2012, each of which is hereby incorporated by reference in its entirety for all purposes.

FIELD OF THE DISCLOSURE

The disclosure is related to consumer electronics and, more particularly, to collecting and providing access to aggregated playback data regarding content played via one or more devices on one or more playback data networks.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology are better understood with regard to the following description, appended claims, and accompanying drawings where:

Figure 1:
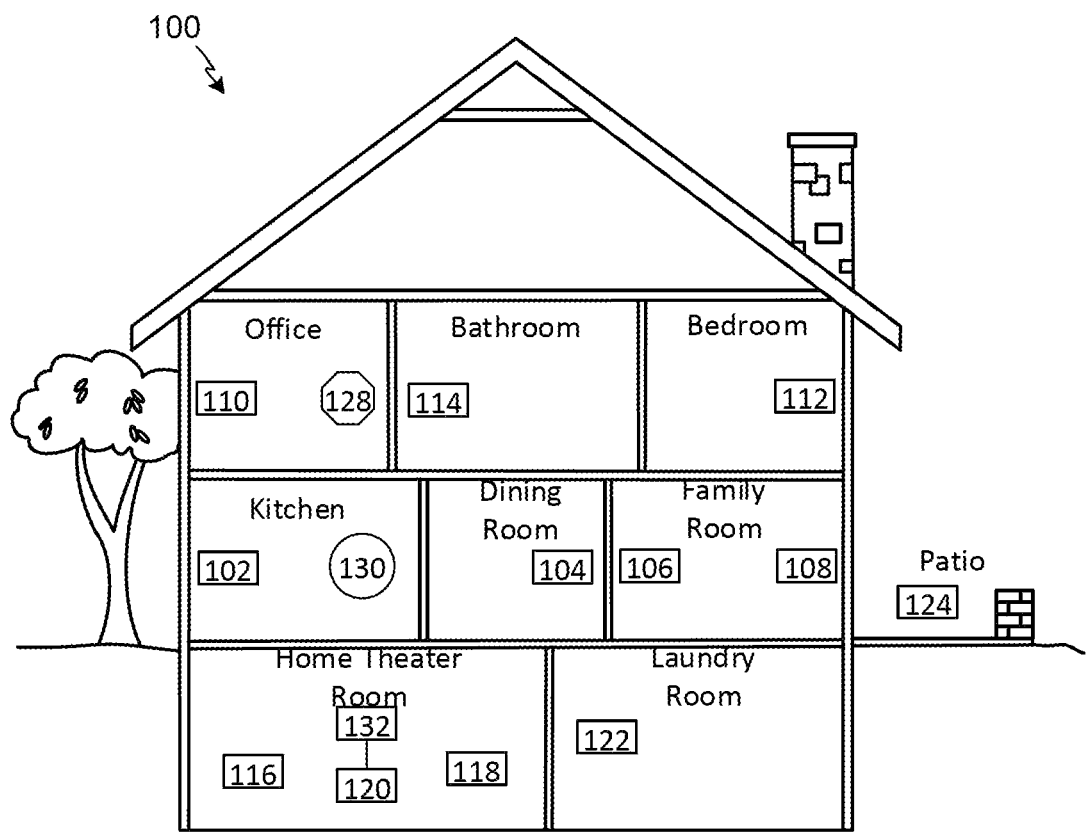
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

The presently described technology enables the collection and use of information gathered from one or more networked audio playback systems. System level, content level, or both kinds of information, such as described herein, may be intelligently gathered and collected from local playback systems by one or more host or server devices via the cloud. The audio playback systems may be located in a specific geographic region or span the entire globe. Further, an audio playback system may include a system to be used as part of a permanent audio solution such as in a home or office or other space, as a portable solution, as an in-vehicle audio system, or as any system where audio can be reproduced.

Data collected from the pool of audio playback systems may be used in a variety of applications. By way of illustration, the data may be found useful by the users of the playback systems, manufacturers of the playback system equipment, those in the music industry, content providers, and any other person or entity that may have an interest in such information. In some embodiments, a playback system may be automatically adjusted responsive to accessing such information. In some embodiments, the information may be used to facilitate a social aspect amongst listeners. In some embodiments, a manufacturer can use the information to design new products or reconfigure old ones. In some embodiments, the music industry can use the information to make better-informed strategy decisions. Many other uses of such information and embodiments are described herein.

For instance, certain embodiments provide a method to collect and organize data from an audio playback network. The example method includes collecting, using a processor, data relating to playback of content at an audio playback network. The example method includes analyzing the collected data based on at least one characteristic. The example method includes generating a representation of the analysis of the collected data. The example method includes providing the representation to the audio playback network.

In another instance, certain embodiments provide a computer readable storage medium including instructions for execution by a processor, the instructions, when executed, cause the processor to implement a method to collect and organize data from a local playback network. The example method includes collecting data relating to playback of content at a local playback network. The example method includes analyzing the collected data based on at least one characteristic. The example method includes generating a representation of the analysis of the collected data. The example method includes providing the representation to the local playback network.

In yet another instance, certain examples provide an apparatus including a wireless communication interface to communicate with at least one local playback network. The example apparatus includes a memory to store data and a processor. The example processor is arranged to collect data relating to playback of content at a local playback network. The example processor is arranged to analyze the collected data based on at least one characteristic. The example processor is arranged to generate a representation of the analysis of the collected data. The example processor is arranged to provide the representation to the local playback network.

II. An Example Operating Environment

Referring now to the drawings, in which like numerals can refer to like parts throughout the figures, FIG. 1 shows an example system 100 in which one or more embodiments disclosed herein can be practiced or implemented.

By way of illustration, system 100 represents a home presently configured with multiple zones, though the home could have been configured with only one zone. Each zone in the home, for example, may represent a different room or space, such as an office, bathroom, bedroom, kitchen, dining room, family room, home theater room, utility or laundry room, and patio. A single zone might also include multiple rooms if so configured. One or more of zone players 102-124 are shown in each respective zone of the home. A zone player 102-124, also referred to as a playback device, multimedia unit, speaker, player, and so on, provides audio, video, and/or audiovisual output. Controller 130 provides control to system 100. Controller 130 may be fixed to a zone, or alternatively, mobile such that it can be moved about the zones. System 100 may also include more than one controller 130. System 100 illustrates an example whole house audio system, though it is understood that the technology described herein is not limited to its particular place of application or to an expansive system like a whole house audio system 100 of FIG. 1.

a. Example Zone Players

Figure 2A:
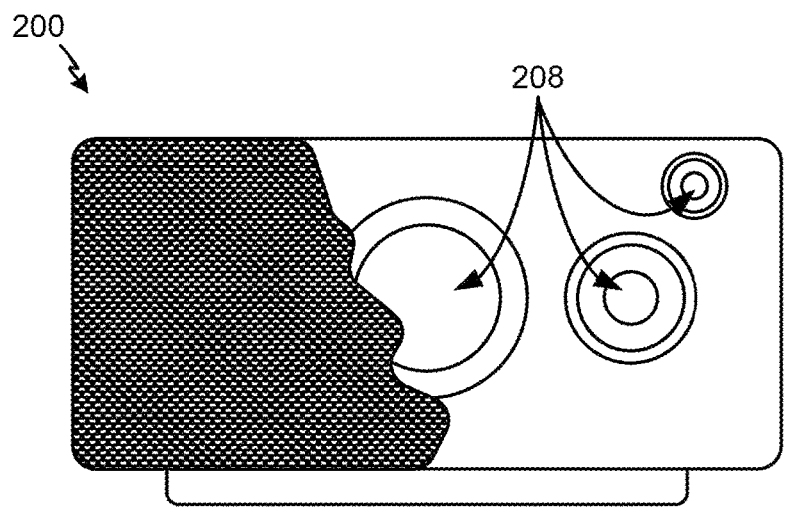
FIG. 2A shows an illustration of an example zone player having a built-in amplifier and speakers.
Figure 2B:
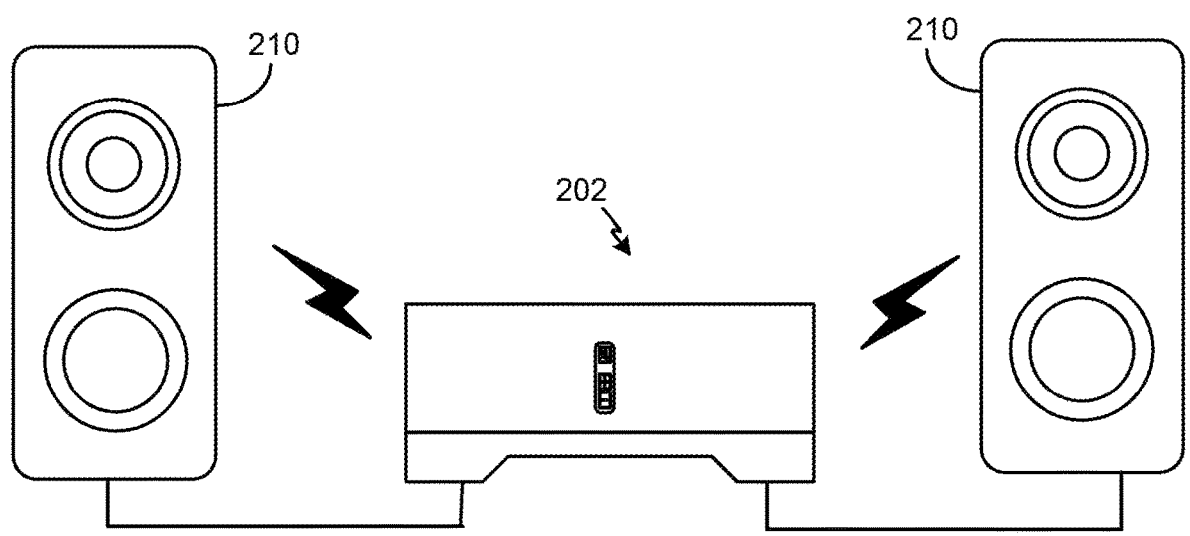
FIG. 2B shows an illustration of an example zone player having a built-in amplifier and connected to external speakers.
Figure 2C:
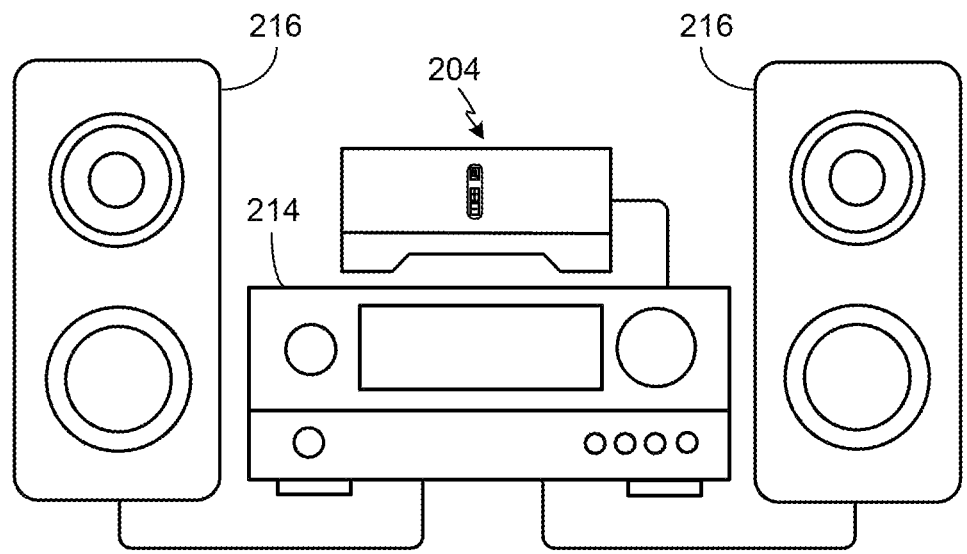
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more speakers. A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played. Each item in the queue may comprise a uniform resource identifier (URI) or some other identifier. The URI or identifier can point the zone player to the audio source. The source might be found on the Internet (e.g., the cloud), locally from another device over data network 128, the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, California presently offers for sale zone players referred to as a "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
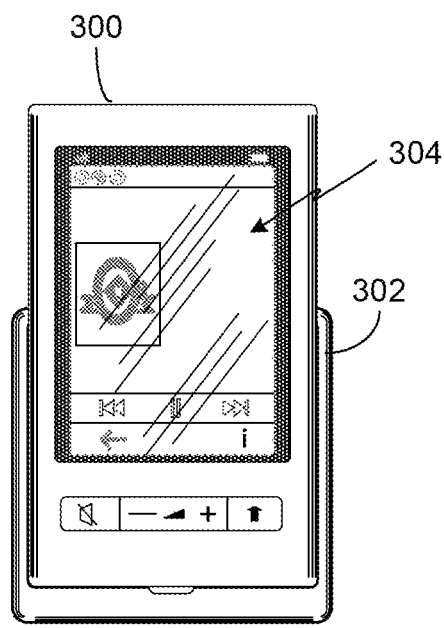
FIG. 3 shows an illustration of an example controller.

FIG. 3 illustrates an example wireless controller 300 in docking station 302. By way of illustration, controller 300 can correspond to controlling device 130 of FIG. 1. Docking station 302, if provided, may be used to charge a battery of controller 300. In some embodiments, controller 300 is provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there can be a limit set on the number of controllers that can control the system configuration 100. The controllers might be wireless like wireless controller 300 or wired to data network 128.

In some embodiments, if more than one controller is used in system 100, then each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™ IPAD™ ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by SONOS, Inc. of Santa Barbara, California include a "Controller 200," "SONOS CONTROL," "SONOS® Controller for IPHONE," "SONOS® Controller for IPHONE," "SONOS® Controller for ANDROID," "SONOS® Controller for MAC or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SonosNet protocol, developed by SONOS, Inc. of Santa Barbara. SonosNet represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Zone Players

Figure 4:
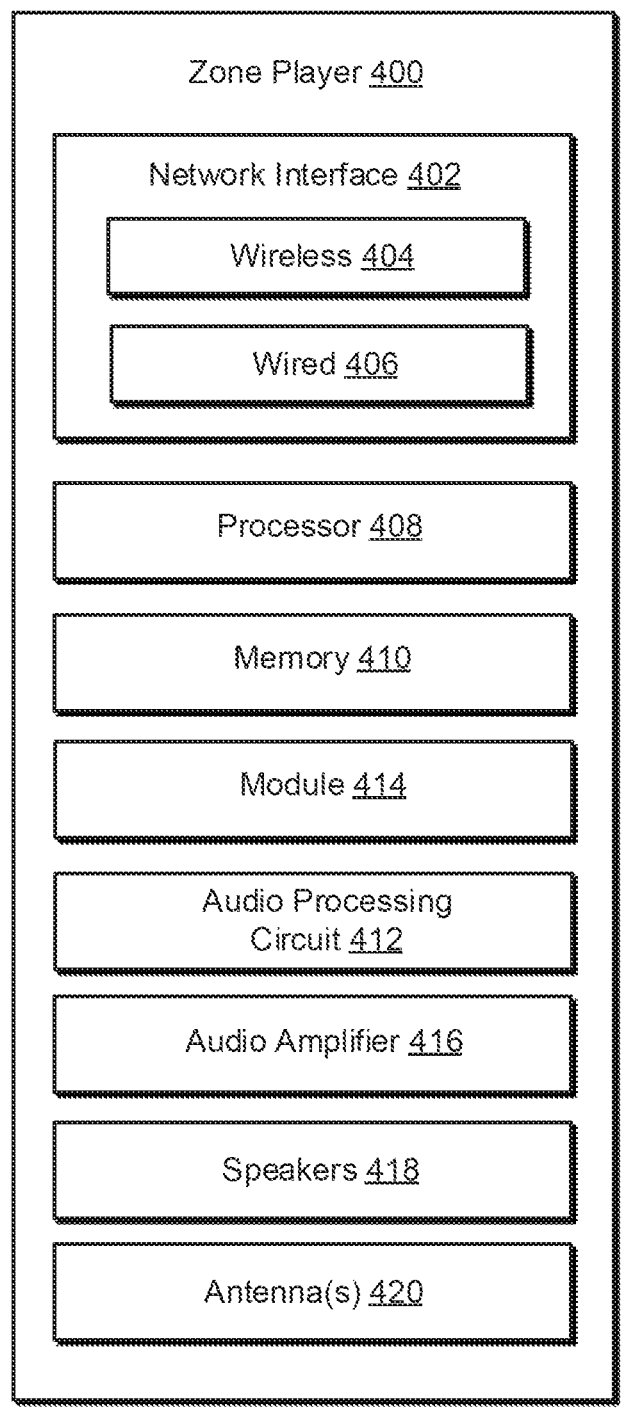
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., middle frequencies), and a tweeter (e.g., high frequencies), for example. An enclosure can be sealed or ported, for example. Each transducer may be driven by its own individual amplifier.

A commercial example, presently known as the PLAY:5, is a zone player with a built-in amplifier and speakers that is capable of retrieving audio directly from the source, such as on the Internet or on the local network, for example. In particular, the PLAY:5 is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, but from different channels of audio. Audio from Internet radio stations, online music and video services, downloaded music, analog audio inputs, television, DVD, and so on, can be played from the PLAY:5.

IV. Controller

Figure 5:
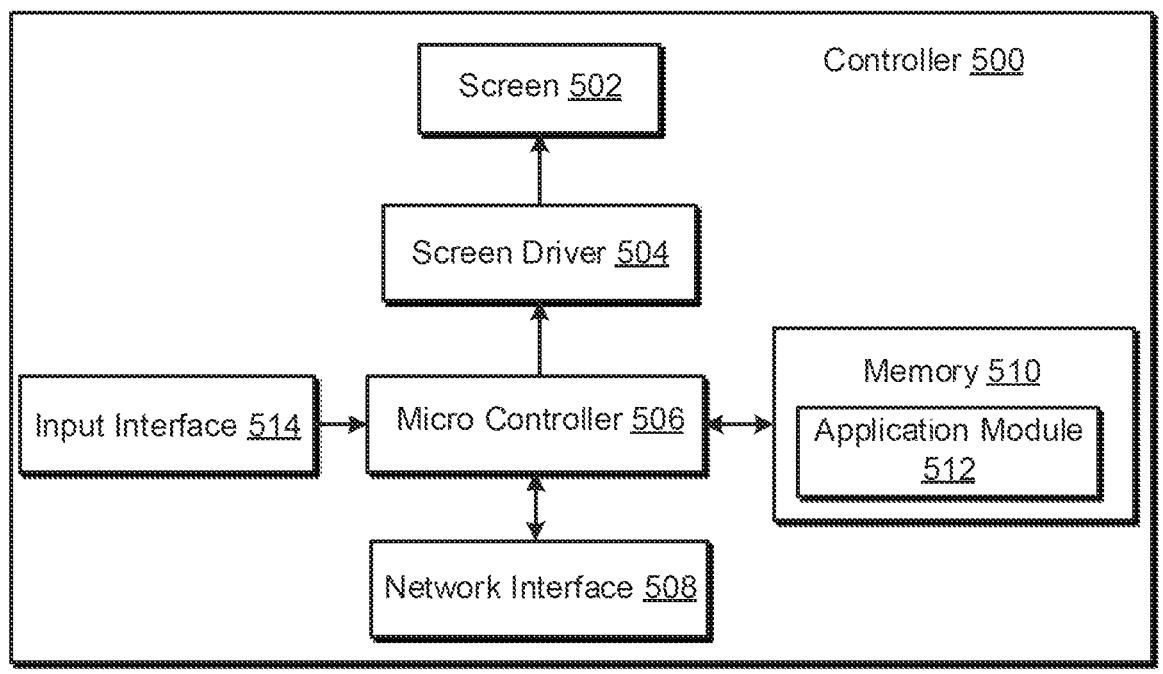
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b 802.11g, 802.11n, or 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE®, IPAD® or any other smart phone or network-enabled device (e.g., a networked computer such as a PC or Mac®) can also be used as a controller to interact or control zone players in a particular environment. In some embodiments, a software application or upgrade can be downloaded onto a network-enabled device to perform the functions described herein.

In certain embodiments, a user can create a zone group (also referred to as a bonded zone) including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
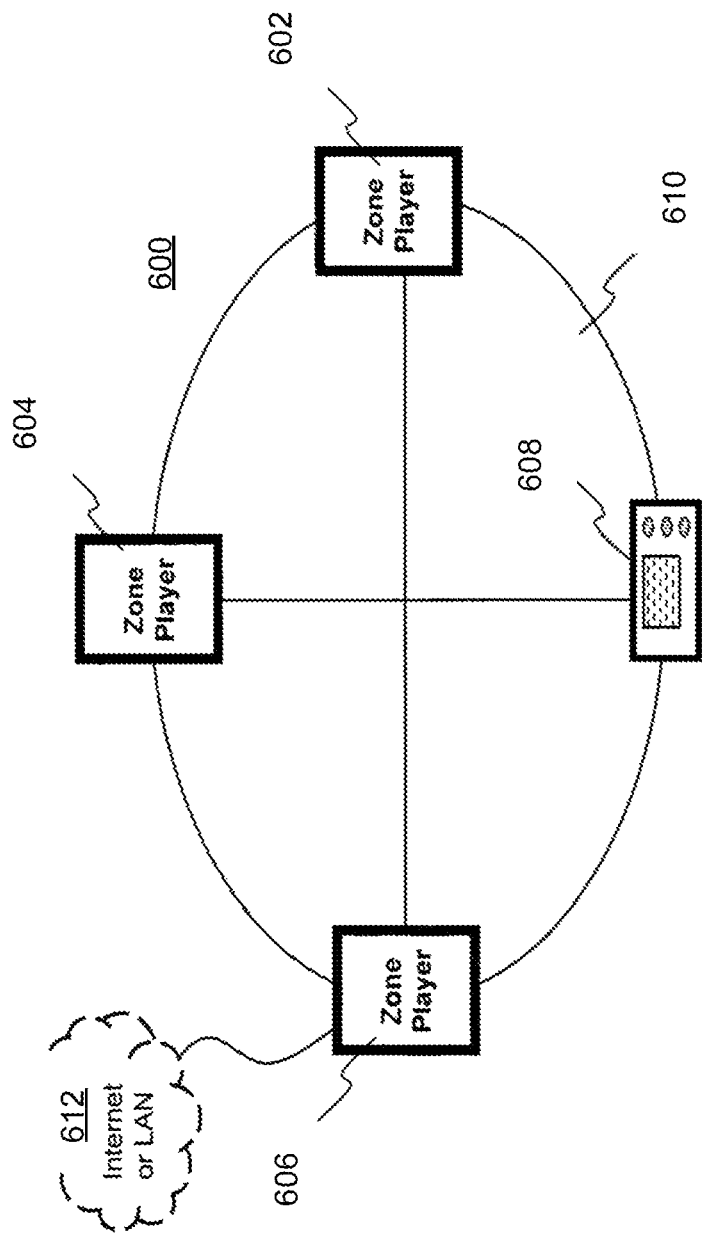
FIG. 6 shows an example ad-hoc playback network.

Examples will now be provided to describe, for purposes of illustration, certain base systems and methods to provide and facilitate connection to a playback network according to an embodiment. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household ID 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 508) also running a CP application module, for example. The zone player is any other device on the network that is placed to participate in the automatic configuration process. The ZP, as a notation used herein, includes the controller 508 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if desired.

It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
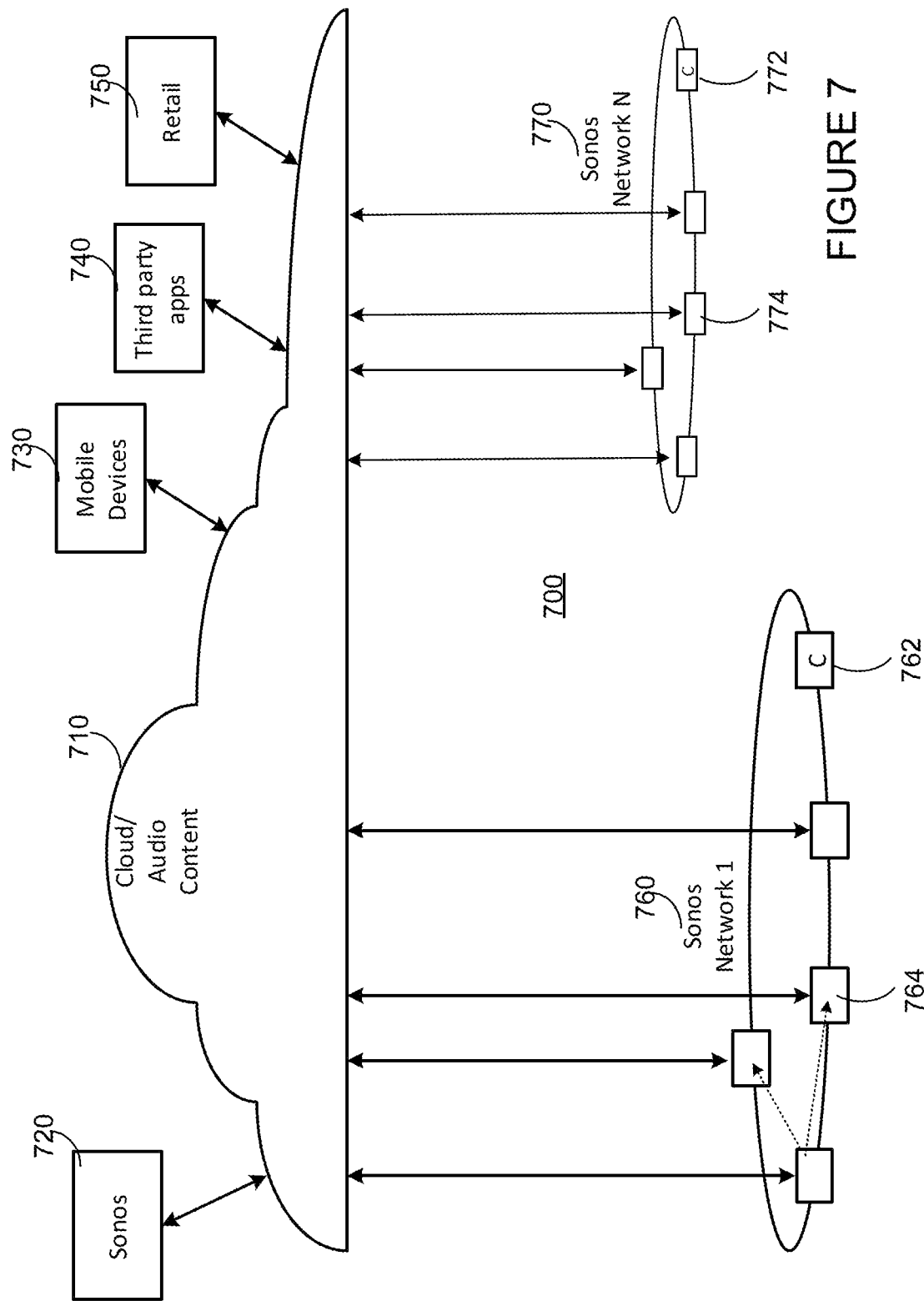
FIG. 7 shows a system including a plurality of networks including a cloud-based network and at least one local playback network.

FIG. 7 shows a system including a plurality of networks including a cloud-based network and at least one local playback network (i.e., at least one audio playback network). The playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a remote host or server 720 (e.g., Sonos™), a mobile device 730, a third party application 740, a content provide 750 and so on can provide multimedia content (requested or otherwise) to local playback networks 760, 770. Within each local playback network 760, 770, a controller 762, 772 and a playback device 764, 774 can be used to playback audio content.

VII. Collected Data and Access to Collected Data

In an example system such as the one shown in FIG. 1, 6 or 7, where a SONOS system, for example, including one or more playback devices and one or more controllers is connected together in a local area network (LAN), the ability to capture information about the system configuration and/or the audio that is played via the system, including items like the audio source, the zone and/or zone player in which audio is played, the genre of music, the equalization, the volume levels, the time of day the audio is played, and where the playback system is geographically located may be valuable. Further, the ability to cross-link these items, and others, for example, linking the genre of music played to the equalization parameters or volume levels or zones or time-of-day, may be valuable.

As described above, an embodiment includes collecting information about an audio playback system and transmitting information to a remote host or server such that the information may be provided to and used by interested persons or systems at a remote location. In another embodiment, obtaining data from a large number of local playback systems or pool of playback systems provides an opportunity to look for patterns and respond effectively depending on the strategy. In yet another embodiment, information from the large data pool may be used to make system adjustments to even a single, local playback system. In yet another embodiment, information from the large data pool may lead to recommendations to users of the playback systems.

In certain embodiments, approval must be granted by a user to gather information from that user's local playback network. The approval may be given via a configuration setting or option via a controller or via some other mechanism.

A. Information Data Collection

In an example system, audio and/or system configuration information, for example, is collected about the local playback system. In some embodiments, the information is initially collected by a single device or a collection of devices in the local playback system. For example, a single device may be determined (e.g., selected by configuration or predetermined) to be responsible to collect information for the system, including information specific to players, zones, and/or zone groups different from the device. For information that is not already exchanged in the system or known by the responsible device, a message exchange or other information gathering technique, for example, can be used between the responsible device and other devices in the local system to collect the information. In another example, each device collects information specific to the players, zones, and/or zone groups of the device. In yet another example, a subset of system devices (e.g., players but not controllers) collect system information including information both specific to the devices and from different devices. Information may be passed between devices wirelessly or wired, or both using the same network used to carry the audio content or a different network.

In an embodiment, the information collected from a playback system is transferred to a remote "cloud server" such as the Sonos cloud server 720 in FIG. 7 where it can be stored, processed and/or made available to other interested persons or systems and devices. In some embodiments, the remote server represents a single server device or a collection of servers such as a server farm. In certain embodiments, the information is "pushed" from the responsible device(s) of the example system to the remote server. For example, based on a trigger or event, the example system may transmit information data to the remote server. In other embodiments, the information is "pulled" from the responsible device(s) of the example system by the server. For example, the remote server may query the example system for the information on a periodic basis or based on an event.

In an embodiment, the information is transferred to the remote server periodically, and may be initiated by either the local system or the remote server. For example, the data may be transferred daily, weekly, or monthly from the local system to the remote server based on a time clock and a periodicity (e.g., using a time clock and period maintained on a device in the local system or on a remote server). When the time period expires, the information is transferred to the server from the one or more responsible devices. In another embodiment, the data is transferred to the remote system based on certain, fixed time-periods such as the duration of a pilot or beta program of an associated device. The time period expiration may be determined, for example, by using a time clock maintained on a device in the local system or on a remote server. For example, at the end of a such a program, the data collected over the time period of the program is transferred from the one or more responsible devices to the remote server. In yet another embodiment, the data is transferred based on an event or a collection of events such that the number of such events cross a threshold. For example, the information data may be transferred to the remote server before a device is upgraded or after 20 hours of audio have been played on the system. In another embodiment, the data is transferred to the remote server as it is collected.

The collected information may be provided to and used by interested persons. For instance, in some embodiments, the data is used by listeners. As an illustration, a listener may use the information in a social context or look to the information for discovery and audio recommendations. The listeners may include listeners of a local playback system like a SONOS system where, for example, the information can be accessed via a controller, listeners of audio in general such as using a mobile phone or web application, or both. In some embodiments, the data is used by those who enable the listening experience, such as, for example, manufacturers of equipment of a local playback system (e.g., SONOS™ or some other provider whose speaker and/or other playback device is the final component in a content playback cycle), the content providers (e.g., PANDORA™, SPOTIFY™, RHAPSODY™, and other content providers), and the audio industry (e.g., music labels, artists, movie industry, and so on) to name several examples. In yet other embodiments, the data is used by local systems for auto configuration based on, for example, similar systems with similar capabilities or settings. In some circumstances, the collected information may represent the most comprehensive data collection pertaining to the system and/or audio played via the system because the playback system is an audio source aggregator among other things.

B. Audio and Configuration Information

In certain embodiments, a local playback system may obtain audio content from a large number of sources such as Internet services, cloud services, stored media (e.g., audio or video stored locally or using a cloud-based storage service), and so on, and play that content (e.g., audio, video, etc.) via one or more playback devices. For example, a listener in a household might be listening to a specific Bill Evans jazz album in the living room that is streaming from an Internet on-demand service, while another listener in the same household is listening to public radio in the kitchen, while yet another listener in the same household is listening to the new Radiohead album that is stored on their MAC™ device on the local network.

According to this example, as a result of the aggregation of sources by a single system, one or more devices of the playback system can obtain information regarding the content played back via the system. In some embodiments, the playback system can gather more knowledge about what, when and how content is being played than any other content provider or service because only the local playback system knows what is currently playing from all aggregated sources. In contrast, a specific content provider (e.g., SPO- TIFY™) is not able to determine whether a locally stored content or content from another provider (e.g., RHAPSODY™) was actually played. Also, information about some content may not be easily identifiable, such as information played from an Internet radio station (e.g., PANDORA™ and so on) where a streaming radio signal is provided instead of song tracks or ID. In this instance, the local playback network can identify and aggregate what song(s) and/or other content are being played regardless of whether it's from Internet radio, local storage, or selected on-demand. For instance, if the 80's hits are being played from an Internet radio channel, the playback system may identify individual songs being played. Furthermore, the local system can aggregate the information from across multiple sources to determine, for example, service-independent information related to a song, playback system, and/or cross-linked song/system combination. For example, how often the genre/artist/etc. is played in a household, what time the content is played, what volume level is selected for each genre, what zone(s) are the content played in, what are the equalization (EQ) settings for the system, user, and/or content, what are the calibration settings for the system, what are the configuration settings, speaker arrangement, and so on. Statistic generation, data mining, and/or other intelligence can be derived from the aggregated data, for example.

In certain embodiments, a cloud-based server like 720 in FIG. 7, for example, may further gather and aggregate audio and system configuration information from multiple local playback systems. The combined, gathered information can be combined, processed, and stored over one or more databases such that the information can be retrieved and used by a local playback system, content provider, system provider, etc., to assist in system configuration and to understand playback habits, listener demographics, content recommendations, development suggestions, other user feedback, and so on. This gathered information, derived from the system hardware/software on a local network, is in many cases more comprehensive than that data collected by a single content provider or even a group of content providers.

In one example embodiment, a graphical representation such as a heat map, fractal map, tree map, choropleth map, etc., may be generated and used to show a user of a particular playback network what global or other network of users is playing. For example, a heat map displayed on a controller, such as described above, or on a web-site can show a user what songs/genres are "hot" right now or even over a time duration (e.g., over the last week, month, year, and so on). A graphical representation can categorize content based on musical attributes or focus traits, such as rhythm, tonality, vocal harmonies, and so on. Graphical representations can be based on an entire network of users or a subset of users (e.g., a subset of users might register to a "jazz" group, and content from that group is aggregated and shared), for example. Information can be conveyed to music industry and/or artists to help supply an appetite or interest in certain types of music, for example. Additionally, playlists and/or other content from a large group can be aggregated, filtered, and shared, for example.

In another example embodiment, global settings such as EQ and/or other configuration settings, can also be pulled from global users or a subset of global users. Instead of relying on default settings configured on a device by the factory that manufactured it, users can choose an EQ setting and/or other setting based on a large population of users. For example, one or more users may choose to share EQ and/or other settings. For example, settings can be taken from a whole set of users or friends and/or other subsets can form shared settings groups or pools (e.g., a friend can share her EQ settings with other members of her friend's group). By way of illustration, a controller might give a user the option to view how others configured their EQ in similar settings or a controller might suggest alternate default settings for a user or a system based on settings from similar systems in the large population. In addition to viewing other configurations, a user may then select one of the configurations for their system.

In yet another example, volume levels, time played, zones played, determination if an entire song is played, and so on may also be useful to the certain people. For example, the music industry may learn and understand more about their audience by analyzing such data. Moreover, Internet radio stations may use the data to adapt their playlists based on such information. By way of illustration, data collected might include something like 35% of the users listen to jazz between the hours of 5 PM and 6:30 PM and play the music at reduced volume levels from the average volume setting.

Figure 8:
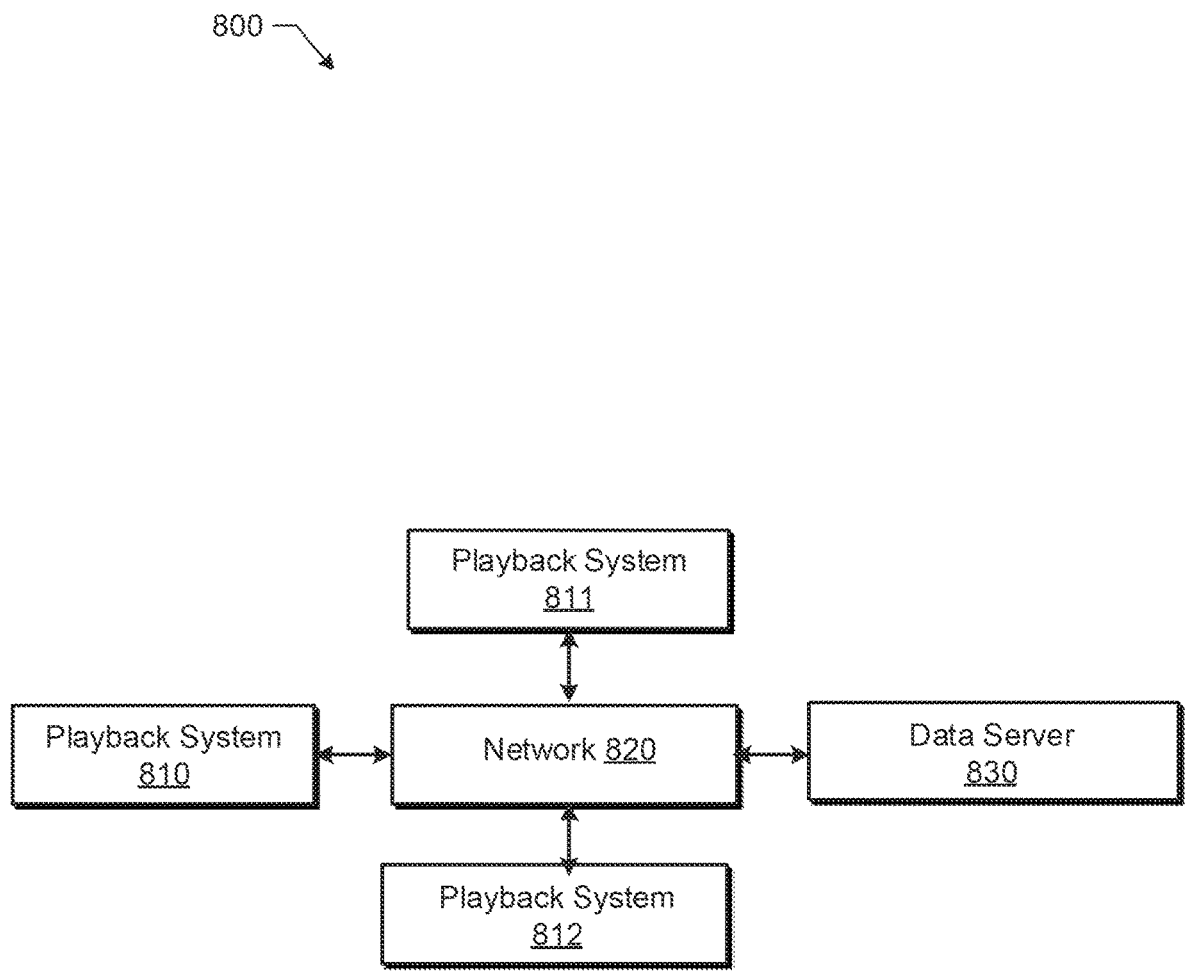
FIG. 8 shows an illustration of an example system to aggregate and share content usage and settings data from one or more local playback networks.

FIG. 8 illustrates an example system 800 to aggregate and share content usage and settings information data from one or more local playback networks. The example system 800 includes a plurality of local playback systems 810-812 connected via a communication network 820, such as a cloud-based network, to a data server 830. The server 830 collects data from the local playback systems 810-812 regarding content playback, settings, preferences, etc., and stores, mines, and analyzes the collected data to determine trends, favorites, best practices, preferred settings, recommended/popular content, and so on. The server 830 can then provide information back to one or more local playback systems 810-812 via the network 820. The server 830 might represent a single server device, a server farm or a collection of servers.

In some embodiments, information from server 830 may be retrieved by devices on individual playback networks and displayed to users on controllers of those systems. Data requests may be on-demand or made periodically. Zone players and/or controllers may perform the request. If a particular zone player requests the data, then the data is preferably retrieved and shared with a controller. The data may be in the form of raw data or assembled in some manner (e.g., a heat map or table) before it is passed to the local playback system. If the data is raw in form, then a zone player and/or controller may process the data to output a useable result to the user. Data may be further processed via application software residing on a controller on the playback network. The application software may be third party developed.

Figure 9:
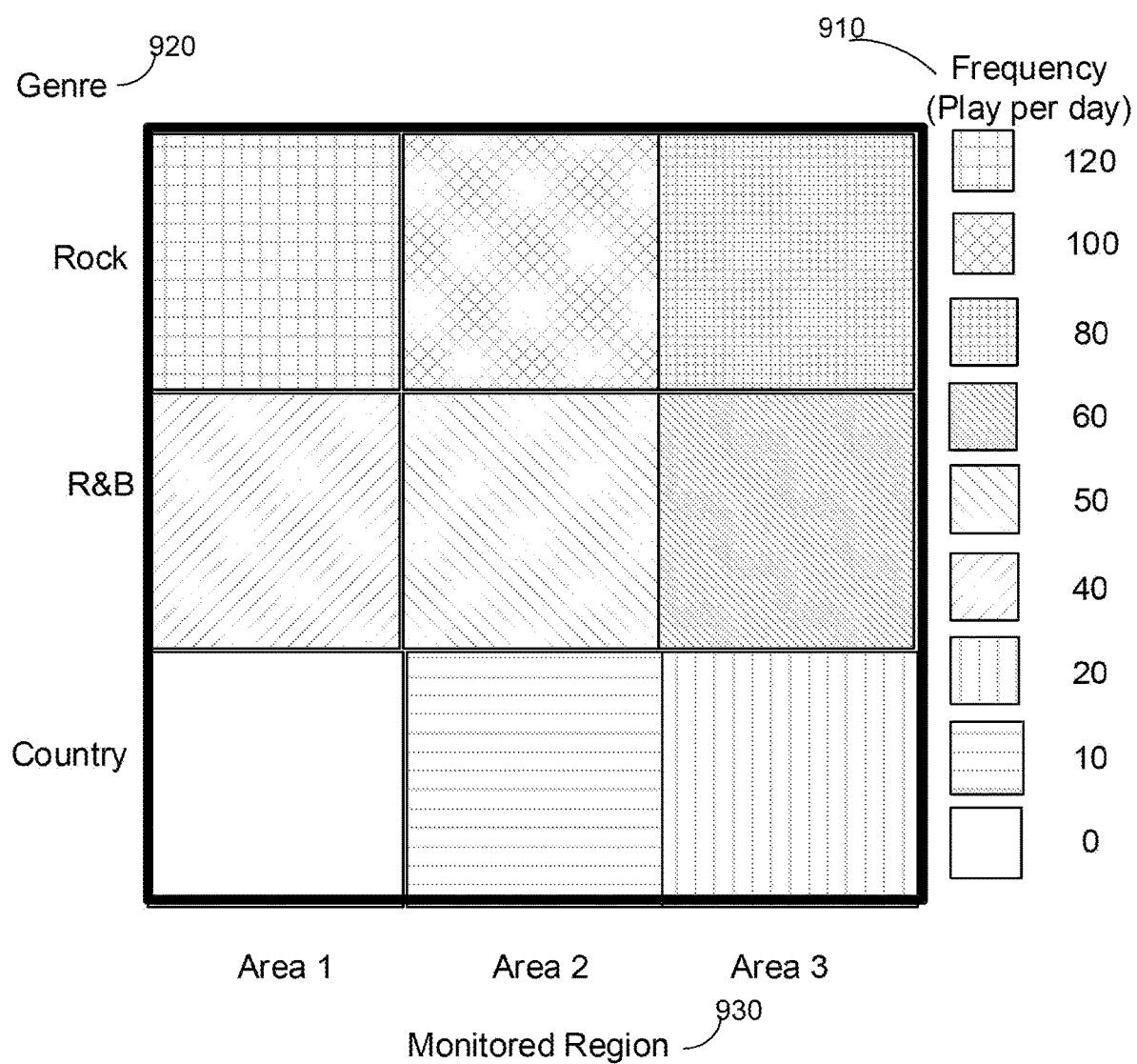
FIG. 9 depicts an example heat map indicating a frequency of which a particular genre of music was played by region.

FIG. 9 depicts an example heat map 900 indicating a frequency 910 of which a particular genre 920 of music was played by region 930. Playback frequency 910 for music of a certain genre 920 (e.g., rock, pop, country, classical, top 40, etc.) can be collected from one or more participating playback systems, aggregated and displayed via the heat map 900. Playback frequency data 910 can be further categorized by region 930 of monitoring, for example. Heat maps or other kinds of visual displays may be used to convey information to listeners and/or other persons interested in such data.

Figure 10:
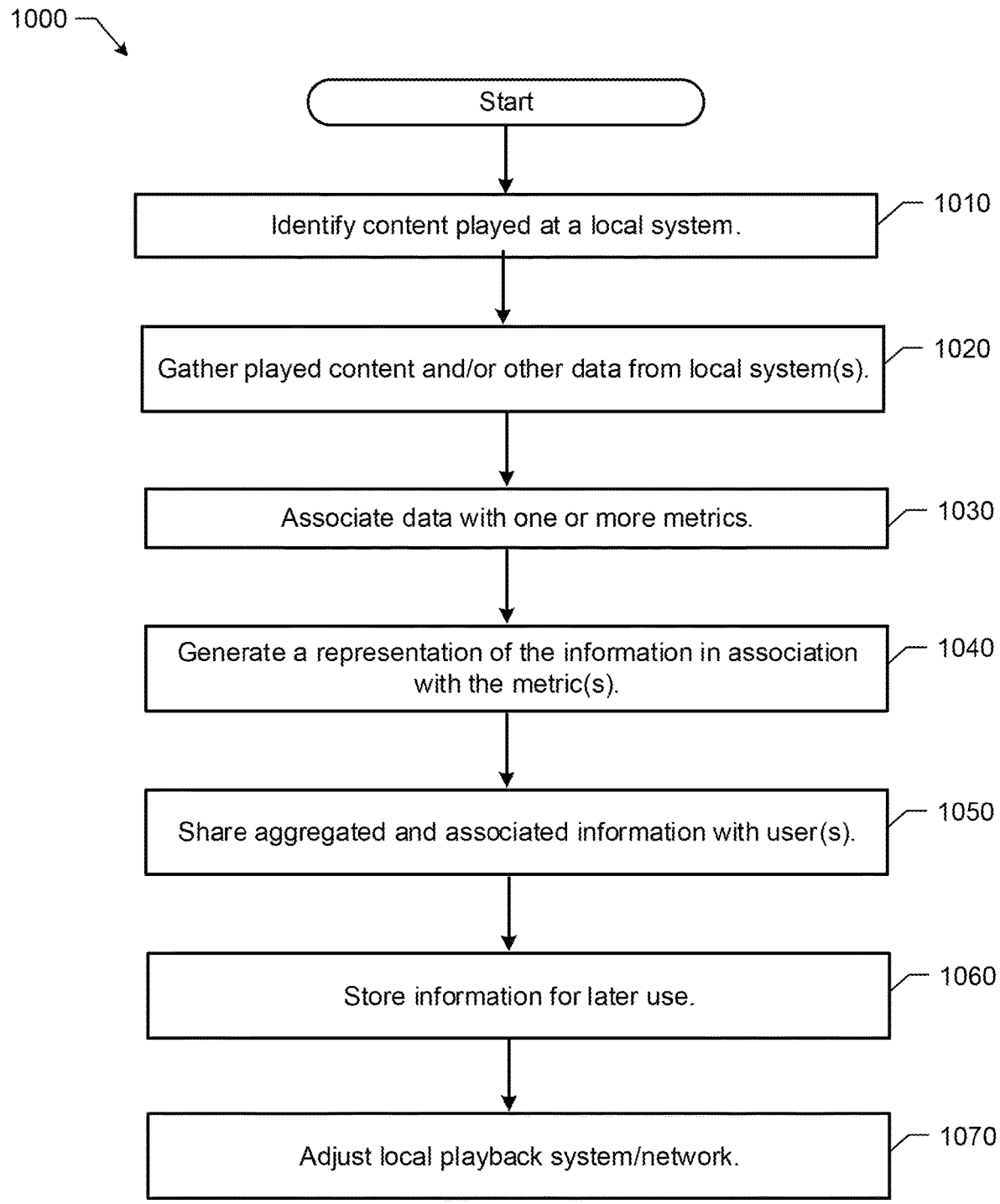
FIG. 10 shows a flow diagram for an example method to aggregate content data from one or more local playback systems.

FIG. 10 shows a flow diagram for an example method 1000 to aggregate content data from one or more local playback systems. At block 1010, content being played back (or other configuration data) is identified at a local playback system. For example, a song being played through a SONOS™ speaker system is identified by the SONOS™ system. The song may be played in an identified zone or zone group. The source of the song may be identified. EQ and other configuration parameters, such as volume, may be identified. For instance, a system might identify that at "5:37 PM," Household 45689 is streaming and playing "Adagio" by "Pepe Romero" from the album "The Art of Pepe Romero" from "Spotify" and is playing in the "Kitchen Zone" at a current volume level of "5 out of 10." The system may record the information at programmed times, intervals, when an action or change occurs (e.g., new track plays or a volume change is detected) to the system, or at some other determined time. In some embodiments, the information may be collected locally and sent to a server in the cloud periodically or at other times. In some embodiments, the information is sent to a server in the cloud when convenient.

At block 1020, played content and/or other local system data is gathered at a remote system. For example, an indication of played content (e.g., a song name or other identifier, movie title, artist, genre, type, etc.) is gathered from one or more local playback systems at a remote data server (e.g., transmitted over a network for storage on a cloud-based data server, and so on). In certain embodiments, approval must be given by a user to gather information from that user's local playback network. For example, a user must agree to share data, participate in an information-gathering program, etc.

At block 1030, data is associated with one or more metrics. For example, gathered data can be associated with a frequency, volume, genre, equalizer settings, configuration settings, playback device arrangement, location of playback, etc. One or more aspects of block 1030 may occur before block 1010 so as to identify which information is to be gathered. Additionally, steps may be taken at block 1030 that filters and/or cross-links data. For instance, it may be determined that 73% of users change EQ settings when changing the music to hip hop.

At block 1040, a representation of the information is generated in association with the one or more metrics. For example, a heat map, table, settings file, etc., can be generated to represent all or part of the gathered information for one or more parameters or metrics. Other kinds of visual displays, textual displays, or a combination can be used to convey the information. In some embodiments, the representation of information is generated by a remote server or workstation device. In some embodiments, the representation is generated by a local device, such as a controller or zone player or some other device.

At block 1050, the aggregated and associated information can be shared with one or more users. For example, in some embodiments, recommended settings, songs, configurations, and so on can be provided for relay or download to a user's local playback network. A popular song list for a given genre can be transferred to a user's local system, for example. Equalizer settings popular for a particular genre can be transferred to a user's local system to be available for user installation and/or to automatically configure the user's local playback system and/or network, for example.

At block 1060, the information can be stored for later use, further analysis, reporting, and so on. Such information may be stored at a remote device, local playback devices, or a combination of the two.

While not necessary, at block 1070, a local playback system and/or network can be adjusted based on the aggregated and associated information. For example, a local playlist can be updated based on provided popular songs. A local playback network's zone group configuration can be adjusted based on monitored zone group data, for example. A local playback system's equalizer settings can be adjusted, for example. A local playback system's content queue can be indexed or searched based on a measured popular characteristic such as genre, artist, rhythm, tonality, harmony, instrument, and so on. In some embodiments, the adjustments occur automatically upon detection of the information by a device on a playback network.

VIII. CONCLUSION

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

For example, a method to collect and organize data from a local playback network includes collecting, using a processor, data relating to playback of content at a local playback network; analyzing the collected data based on at least one characteristic; generating a representation of the analysis of the collected data; and providing the representation to the local playback network.

In another example, the method just above, wherein the at least one characteristic includes at least one of a content name, content type, content artist, volume, playback zone, equalizer setting, and configuration setting.

In yet another example, a method further comprises determining at least one of recommended content and recommended setting based on the analysis of the collected data.

In another example, a method further comprises remotely providing the at least one of recommended content and recommended setting to the local playback network.

In another example, a method further comprises automatically adjusting at least one of content for playback and a local playback setting based on the at least one of recommended content and recommended setting provided to the local playback network.

In yet another example, at least one of recommended content and recommended setting is provided to a plurality of local playback networks associated by a group.

In another example, a method further comprises storing the at least one of recommended content and recommended setting in a cloud-based storage for access by the local playback network.

In another example, an apparatus includes a wireless communication interface to communicate with at least one local playback network; a memory to store data; and a processor to: collect data relating to playback of content at a local playback network; analyze the collected data based on at least one characteristic; generate a representation of the analysis of the collected data; and provide the representation to the local playback network.

Although the above discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the above describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Systems, methods, apparatus, and articles of manufacture to facilitate gathering, aggregation and analysis of content playback and system data from one or more local playback networks. Certain embodiments facilitate analysis and recommendation to one or more local playback systems based on the aggregated and analyzed data.

The invention claimed is:

1. A cloud-based computing device comprising:
at least one processor;
at least one non-transitory computer-readable medium; and
program instructions stored on the at least one non-transitory computer-readable medium that are executable by the at least one processor such that the cloud-based computing device is configured to:
receive, from each of a plurality of computing devices in a respective plurality of local media playback systems, respective configuration setting information used for an audio content item played back by respective playback devices in the local media playback systems, wherein each local media playback system is associated with a different user;
based on the respective configuration setting information received from the plurality of computing devices, generate aggregated configuration setting information for the audio content item;
based on the generated aggregated configuration setting information, determine a frequency of usage of certain configuration setting information by local media playback systems of the plurality of local media playback systems for the audio content item;
transmit the aggregated configuration setting information for the audio content item to a particular playback device; and
cause the particular playback device to update settings of the particular playback device for playback of the audio content item based on the determined frequency of usage of the certain configuration setting information.

2. The cloud-based computing device of claim 1, further comprising program instructions stored on the at least one non-transitory computer-readable medium that are executable by the at least one processor such that the cloud-based computing device is configured to:
cause an indication of the aggregated configuration setting information for the audio content item to be displayed via a controller device of the particular playback device.

3. The cloud-based computing device of claim 1, wherein the respective configuration setting information for the audio content item comprises at least one of a volume setting or an EQ setting for the audio content item.

4. The cloud-based computing device of claim 1, wherein the program instructions that are executable by the at least one processor such that the cloud-based computing device is configured to generate the aggregated configuration setting information for the audio content item comprise program instructions that are executable by the at least one processor such that the cloud-based computing device is configured to generate a graphical representation of the aggregated configuration setting information, wherein the graphical representation comprises at least one of a heat map, a fractal map, a tree map, or a choropleth map.

5. The cloud-based computing device of claim 4, further comprising program instructions stored on the at least one non-transitory computer-readable medium that are executable by the at least one processor such that the cloud-based computing device is configured to:
cause an indication of the graphical representation to be displayed via a controller device of the particular playback device.

6. The cloud-based computing device of claim 1, wherein the program instructions that are executable by the at least one processor such that the cloud-based computing device is configured to receive, from each of the plurality of computing devices in the respective plurality of local media playback systems, the respective configuration setting information used for the audio content item comprise program instructions that are executable by the at least one processor such that the cloud-based computing device is configured to:
receive, from each of the plurality of computing devices in the respective plurality of local media playback systems, respective configuration setting information for the respective playback devices in the respective local media playback systems.

7. The cloud-based computing device of claim 6, wherein the particular playback device is part of a particular local playback system, further comprising program instructions stored on the at least one non-transitory computer-readable medium that are executable by the at least one processor such that the cloud-based computing device is configured to:
cause playback devices of the particular local playback system to be reconfigured based on the respective configuration setting information for the respective playback devices in the respective local media playback systems.

8. The cloud-based computing device of claim 1, wherein the frequency of usage of the certain configuration setting information comprises a trend of usage of the certain configuration setting information.

9. The cloud-based computing device of claim 1, wherein the program instructions that are executable by the at least one processor such that the cloud-based computing device is configured to cause the particular playback device to update the settings of the particular playback device for playback of the audio content item based on the determined frequency of usage of the certain configuration setting information comprise program instructions that are executable by the at least one processor such that the cloud-based computing device is configured to cause the particular playback device to update the settings of the particular playback device to the certain configuration setting information for playback of the audio content item.

10. A non-transitory computer-readable medium, wherein the non-transitory computer-readable medium is provisioned with program instructions that, when executed by at least one processor, cause a cloud-based computing device to:
   receive, from each of a plurality of computing devices in a respective plurality of local media playback systems, respective configuration setting information used for an audio content item played back by respective playback devices in the local media playback systems, wherein each local media playback system is associated with a different user;
   based on the respective audio playback information received from the plurality of computing devices, generate aggregated configuration setting information for the audio content item;
   based on the generated aggregated configuration setting information, determine a frequency of usage of certain configuration setting information by local media playback systems of the plurality of local media playback systems for the audio content item;
   transmit the aggregated configuration setting information for the audio content item to a particular playback device; and
   cause the particular playback device to update settings of the particular playback device for playback of the audio content item based on the determined frequency of usage of the certain configuration setting information.

11. The non-transitory computer-readable medium of claim 10, wherein the non-transitory computer-readable medium is also provisioned with program instructions that, when executed by at least one processor, cause the cloud-based computing device to:
   cause an indication of the aggregated configuration setting information for the audio content item to be displayed via a controller device of the particular playback device.

12. The non-transitory computer-readable medium of claim 10, wherein the respective configuration setting information for the audio content item comprises at least one of a volume setting or an EQ setting for the audio content item.

13. The non-transitory computer-readable medium of claim 10, wherein the program instructions that, when executed by at least one processor, cause the cloud-based computing device to generate the aggregated configuration information for the audio content item comprise program instructions that, when executed by at least one processor, cause the cloud-based computing device to generate a graphical representation of the aggregated configuration setting information, wherein the graphical representation comprises at least one of a heat map, a fractal map, a tree map, or a choropleth map.

14. The non-transitory computer-readable medium of claim 13, wherein the non-transitory computer-readable medium is also provisioned with program instructions that, when executed by at least one processor, cause the cloud-based computing device to:
   cause an indication of the graphical representation to be displayed via a controller device of the particular playback device.

15. The non-transitory computer-readable medium of claim 10, wherein the frequency of usage of the certain configuration setting information comprises a trend of usage of the certain configuration setting information.

16. A method carried out by a cloud-based computing device, the method comprising:
   receiving, from each of a plurality of computing devices in a respective plurality of local media playback systems, respective configuration setting information used for an audio content item played back by respective playback devices in the local media playback systems;
   based on the respective configuration setting information received from the plurality of computing devices, generating aggregated configuration setting information for the audio content item;
   based on the generated aggregated configuration setting information, determining a frequency of usage of certain configuration setting information by local media playback systems of the plurality of local media playback systems for the audio content item;
   transmitting the aggregated configuration setting information for the audio content item to a particular playback device; and
   causing the particular playback device to update settings of the particular playback device for playback of the audio content item based on the determined frequency of usage of the certain configuration setting information.

17. The method of claim 16, further comprising:
   causing an indication of the aggregated configuration setting information for the audio content item to be displayed via a controller device of the particular playback device.

18. The method of claim 16, wherein generating the aggregated configuration information for the audio content item comprises generating a graphical representation of the aggregated configuration setting information, wherein the graphical representation comprises at least one of a heat map, a fractal map, a tree map, or a choropleth map.

19. The method of claim 18, further comprising:
   causing an indication of the graphical representation to be displayed via a controller device of the particular playback device.

20. The method of claim 16, wherein the respective configuration setting information for the audio content item comprises at least one of a volume setting or an EQ setting for the audio content item.

* * * * *